(12) United States Patent
Naick et al.

(10) Patent No.: US 8,010,520 B2
(45) Date of Patent: Aug. 30, 2011

(54) VIEWING TIME OF SEARCH RESULT CONTENT FOR RELEVANCY

(75) Inventors: Indran Naick, Cedar Park, TX (US);
Jeff K. Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 710 days.

(21) Appl. No.: 12/020,248

(22) Filed: Jan. 25, 2008

(65) Prior Publication Data

US 2009/0193009 A1 Jul. 30, 2009

(51) Int. Cl.
*G06F 7/00* (2006.01)
*G06F 17/30* (2006.01)
(52) U.S. Cl. .................. 707/706; 707/713; 707/722
(58) Field of Classification Search .................. 707/736, 707/713, 722, 758, 706; 705/26
See application file for complete search history.

(56) References Cited

U.S. PATENT DOCUMENTS

| | | | |
|---|---|---|---|
| 6,421,675 B1 * | 7/2002 | Ryan et al. ........................... | 1/1 |
| 6,873,982 B1 * | 3/2005 | Bates et al. .................. | 707/737 |
| 2006/0020593 A1 * | 1/2006 | Ramsaier et al. .................. | 707/5 |
| 2006/0053065 A1 * | 3/2006 | Bowman et al. ................ | 705/26 |
| 2006/0167859 A1 * | 7/2006 | Verbeck Sibley et al. ........ | 707/3 |
| 2009/0119276 A1 * | 5/2009 | Neron ............................... | 707/5 |

FOREIGN PATENT DOCUMENTS

JP 10143519 A * 5/1998

OTHER PUBLICATIONS

Sharma, Himanshu et al., "Automated Evaluation of Search Engine Performance via Implicit User Feedback", *In Proceedings of the 28th Annual international ACM SIGIR Conference on Research and Development in information Retrieval*, (Salvador, Brazil), SIGIR '05. ACM, New York, NY, 649-650, ACM 1-59593-034-5/05/0008.,(Aug. 15-19, 2005).

* cited by examiner

*Primary Examiner* — Giovanna Colan
(74) *Attorney, Agent, or Firm* — DeLizio Gilliam, PLLC (57) ABSTRACT

Amounts of time that search result content is displayed for viewing can be collected and used for relevancy ranking. Selection of a first of a plurality of search results is detected. The plurality of search results is received in response to submission of a set of one or more search terms. An amount of time content of the first search result is displayed for viewing is determined. The content is loaded in response to the selection of the first search result. An indication of the amount of time is supplied as input for ranking relevancy of the first search result with respect to the set of one or more search terms.

20 Claims, 8 Drawing Sheets

VIEWING TIME OF SEARCH RESULT CONTENT FOR RELEVANCY

TECHNICAL FIELD

Embodiments of the inventive subject matter generally relate to the field of computers, and, more particularly, to relevancy of search results.

BACKGROUND

Search engines strive to provide the most relevant search results to a user. Search engines utilize popularity data, number of occurrences of a search term on a web page, and, perhaps, authority data to compute relevancy of web pages. Although popularity data may be useful, popularity data reflects no more than selection of a link to a web page.

SUMMARY

Selection of a first of a plurality of search results is detected. The plurality of search results is received in response to submission of a set of one or more search terms. An amount of time content of the first search result is displayed for viewing is determined. The content is loaded in response to the selection of the first search result. An indication of the amount of time is supplied as input for ranking relevancy of the first search result with respect to the set of one or more search terms.

BRIEF DESCRIPTION OF THE DRAWINGS

The present embodiments may be better understood, and numerous objects, features, and advantages made apparent to those skilled in the art by referencing the accompanying drawings.

FIGS. 6-7 depict flowcharts of example operations for tracking viewing time of content analogous to search result content. FIG. 6 depicts a flowchart of operations for tracking viewing time of content analogous to search result content.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to time as a viewing metric, embodiments may utilize other metrics. In other instances, well-known instruction instances, protocols, structures and techniques have not been shown in detail in order not to obfuscate the description.

Collecting data that reflects viewing time of search result content provides informative data for search relevancy and another tool to combat intentional pollution of relevancy data. Mere clicking fails to account for viewing behavior, which is more informative with respect to relevancy. Thousands of users may select a first search result, which suggests popularity of the first search result. The majority of those users, however, may quickly return to the search results because the content of the first search result was not relevant or not sufficiently relevant. The quick departure from the content, however, is not taken into account for relevancy. Greater viewing time of content suggests greater relevancy of the content with respect to a search. Content viewing time in light of amount and/or complexity of content also provides relevancy data that may be more informative than naked link selection data. Viewing time can also be used to detect and ignore fraudulent clicks.

In addition, relevancy based on viewing time can be extended beyond viewing time of content displayed in response to selection of a search result. A tool or program can also track viewing time of subsequently displayed content determined to be analogous to the search result content. The tool or program can track viewing time of a family of analogous content descending from and/or associated with the search result content. The viewing time of the family of analogous content can be used to augment relevancy of the search result content.

Figure 1:
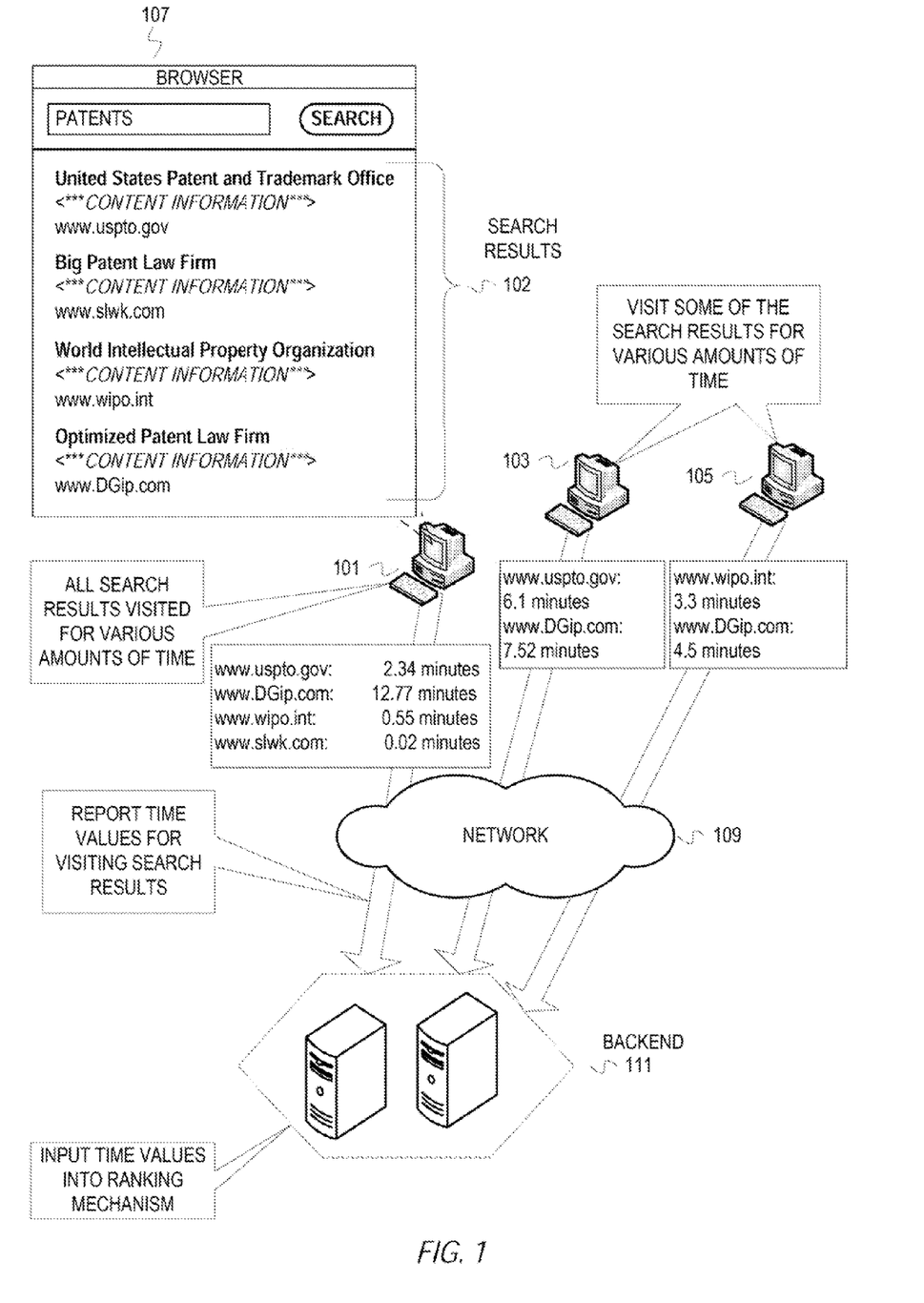
FIG. 1 is an example conceptual diagram that depicts collecting viewing time of search result content for relevancy ranking.

FIG. 1 is an example conceptual diagram that depicts collecting viewing time of search result content for relevancy ranking. Each of clients 101, 103, and 105 displays a browser 107. The browser 107 presents search results 102 returned for a search query on "patents." The search results 102 include references to the United States Patent Office ("USPTO"), the Big Patent Taw Firm ("slwk"), the World Intellectual Property Organization ("WIPO"), and the Optimized Patent Law Firm ("DGIP"), which are presented in order of relevancy from most relevant to less relevant. At the client 101, all of the search results 102 are visited for various amount of time. At the clients 103 and 105, some of the search results 102 are visited for various amounts of time.

The clients 101, 103, and 105 report viewing time values of the viewed search result content to a backend 111 via a network 109. According to a report from the client 101, the client 101 displayed content for viewing from the USPTO for 2.34 minutes, from DGIP for 12.77 minutes, from the WIPO for 0.55 minutes, and from SLWK for 0.02 minutes. According to a report from the client 103, the client 103 displayed content for viewing from the USPTO for 6.1 minutes and from DGIP for 7.52 minutes. According to a report from the client 105, the client 105 displayed content for viewing from the WIPO for 3.3 minutes and from DGIP for 4.5 minutes. Across the clients 101, 103, and 105, content from the USPTO and from DGIP were displayed the longest at 8.44 minutes and 24.79 minutes, respectively. The time values are input into a search relevancy ranking mechanism or process in the backend 111.

Figure 2:
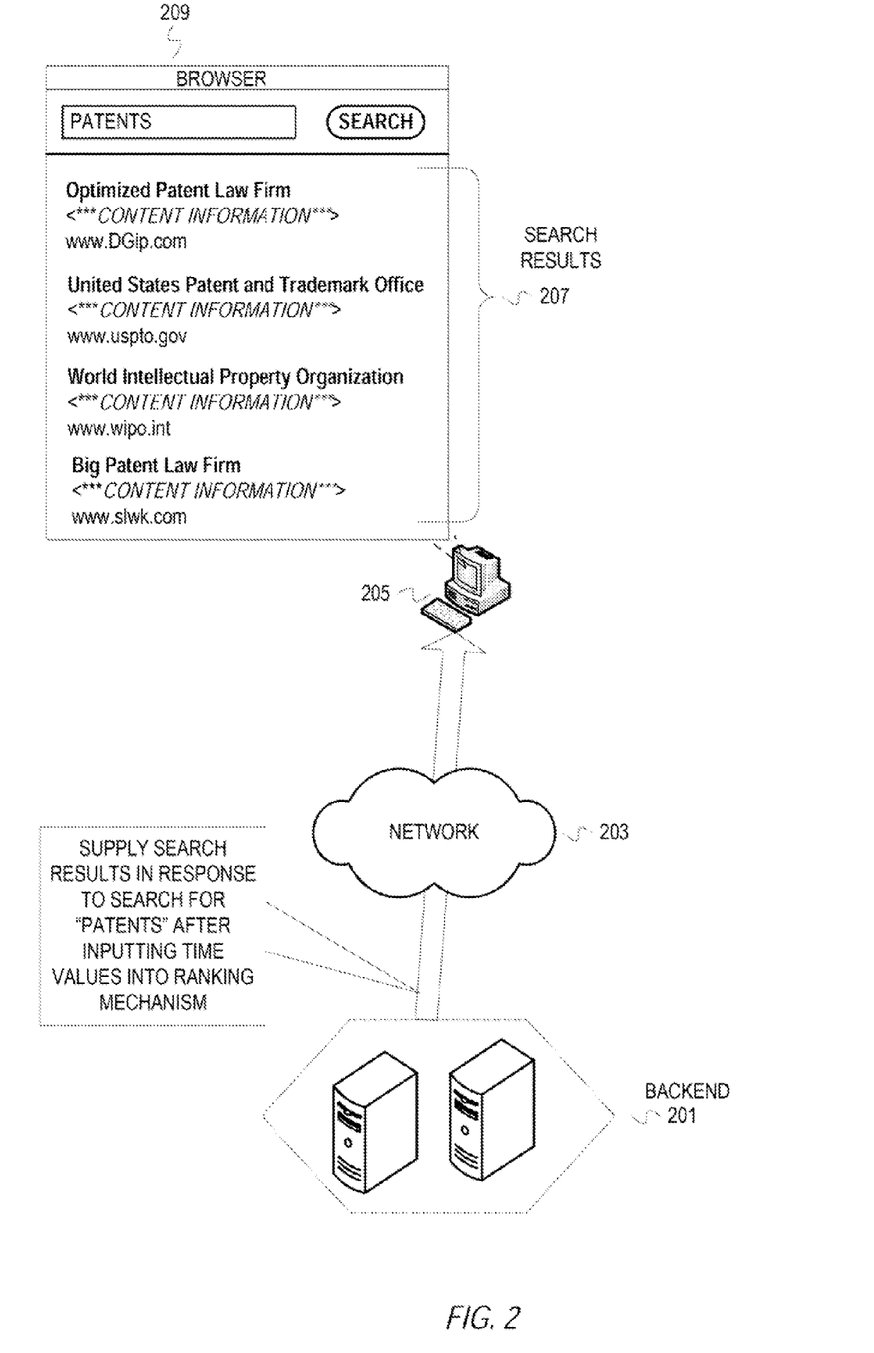
FIG. 2 is an example conceptual diagram that depicts impact of the time values reported in FIG. 1.

FIG. 2 is an example conceptual diagram that depicts impact of the time values reported in FIG. 1. In response to a search query on "patents" from a client 205, the backend 201 supplies search results via a network 203. The client 205 displays a browser 209, which presents search results 207 supplied from the backend 201. In contrast to the search results presented in FIG. 1, the backend 201 has supplied the search results 207 in the following order of decreasing relevancy: DGIP, USPTO, WIPO, and SLWK. The time values have impacted relevancy ranking resulting in increased relevancy of DGIP and decreased relevancy of SLWK based, at least partly, on viewing times. It should be understood that the time values and depicted impact on relevancy ranking are examples. Embodiments can be implemented to augment or mute the impact of time values on relevancy ranking. For instance, the USPTO search result may preserve rank of most relevant for a search query on "patents," despite time values less than those for DGIP, based on other parameters (e.g., popularity index, frequency of search term in content of the USPTO, etc.). In addition, viewing time values can be fed directly or indirectly into the relevancy ranking mechanism. For example, search relevancy of a web page can be determined with popularity index, frequency of search term in the content, and viewing time values. In another example, the viewing time values are used to modify the popularity index, which is then fed into the ranking mechanism.

Figure 3:
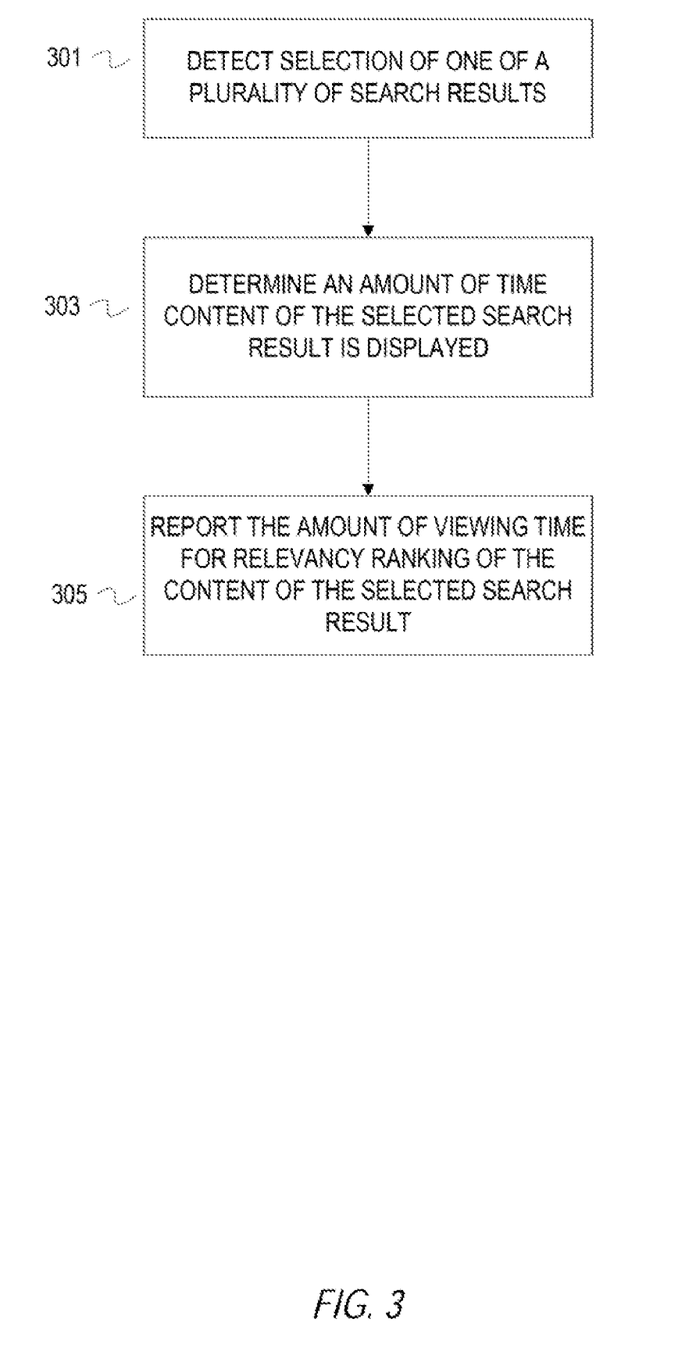
FIG. 3 depicts a flowchart of example operations to utilize viewing time for ranking.

FIG. 3 depicts a flowchart of example operations to utilize viewing time for ranking. At block 301, selection of one of a plurality of search results is detected. Examples of detecting selection of a search result include detecting clicking on a hyperlink, detecting a mouse over event over a search result, detecting a request message for content of the search result, etc.

At block 303, an amount of time that content of the selected search result is displayed is determined. The amount of time can be measured with various techniques that base start and stop times on various activities and/or events. Example events/activities that trigger recording of a viewing start time include displaying the search result content, detecting a request message for the search result content, partial display of the search result content, detecting mouse over activity over the search result content, etc. Example events/activities that trigger recording of a viewing stop time include selection of a different search result, a request message for different content, lack of mouse activity for a predefined period of time, a decrease in viewing state of hardware that affects display (e.g., sleep event, hibernate event, etc.), obstructing display of the search result content (e.g., browser window is sent to background or minimized, selection of a different tab, etc.), window close, tab close, launching of a different application, etc.

At block 305, the determined amount of viewing time is supplied as input for ranking relevancy of the content of the selected search result.

Embodiments can ascertain viewing times of search result content with different implementations. Example implementations include employing a plug-in or add-on to a browser, modifying browser functionality (e.g., tracking browsing history), leveraging a portal, employing code embedded within a web page, and a combination of these example implementations (e.g., leveraging a portal and employing embedded scripts). A few of these example implementations are illustrated in FIGS. 4 and 5.

Figure 4:
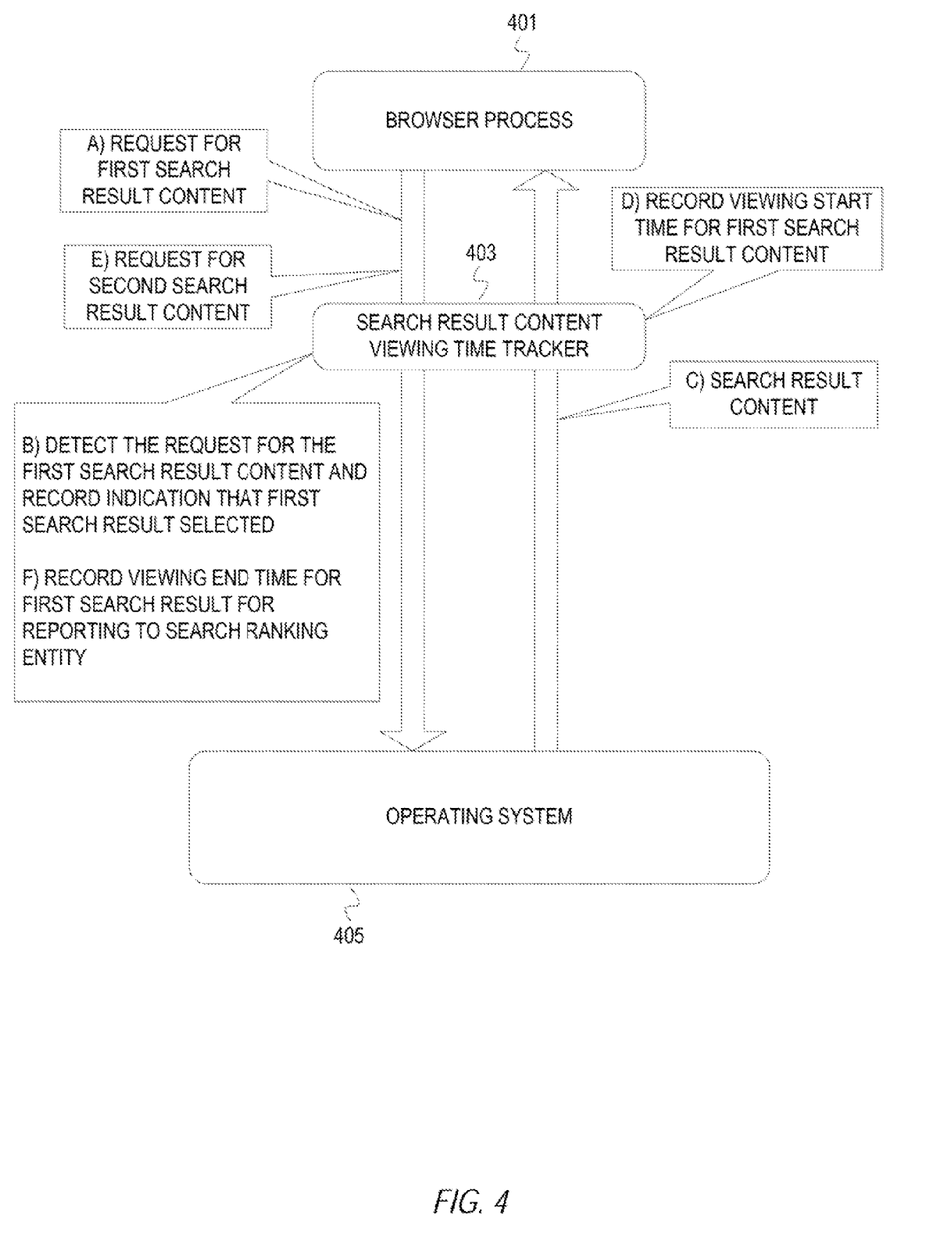
FIG. 4 is a conceptual diagram that depicts a process at a client determining viewing times of search result content based on detecting a request.
Figure 5:
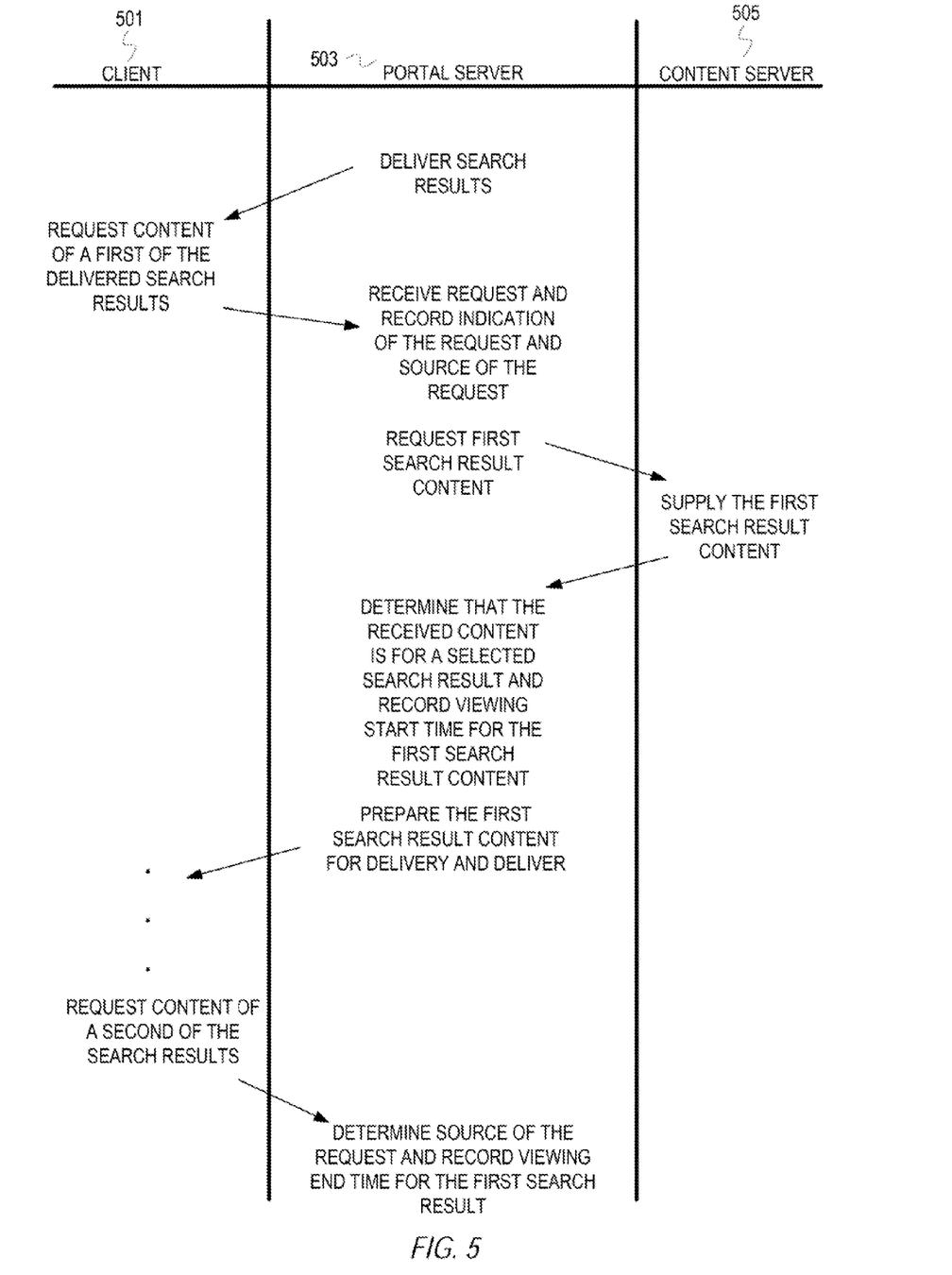
FIG. 5 is a conceptual diagram that depicts example functionality embodied at a portal server to determine viewing times of search result content.

FIG. 4 is a conceptual diagram that depicts a process at a client determining viewing times of search result content based on detecting a request. A client hosts a browser process 401, an operating system 405 and a search result content viewing time tracker 403. The browser process 401 requests content of a first search result at a stage A. The request from the browser process 401 is visible to the search result content viewing time tracker ("tracker") 403. At a stage B, the tracker 403 detects the request for the first search result content and records an indication that the first search result was selected. At a stage C, the operating system 405 forwards search result content to the browser process 401. At a stage D, the tracker 403 detects the search result content and records a viewing start time for the first search result.

At a stage E, the tracker 403 detects a request from the browser process 401 to the operating system 405 for content of a second search result. At a stage F, the tracker 403 records a viewing end time for the first search result for eventual reporting to a search ranking entity (e.g., search engine).

It should be understood that aspects of FIG. 4 should not be used to limit embodiments since FIG. 4 illustrates an example. For instance, a viewing end time can be captured temporarily for computing of viewing time without necessarily recording the viewing end time for persistence. FIG. 4 also assumes an environment that directs messages, such as the request, from processes through the operating system 405. Embodiments can be implemented in an environment that allows direct inter-process communications. In addition, embodiments can implement the functionality of the tracker 403 in an operating system.

FIG. 5 is a conceptual diagram that depicts example functionality embodied at a portal server to determine viewing times of search result content. A portal server 503 delivers search results to a client 501. The client 501 transmits a request for content of a first of the delivered search results to the portal server 503. The portal server 503 receives the request and records an indication that the first search result was selected and records the source of the request. For example, the portal server 503 maintains a structure or database of selected search results and sources of the selections. The portal server 503 requests the first search result content from a content server 505. When the requested content is received at the portal server 503, the portal server 503 determines that the received content is for a selected search result and records a viewing start time for the first search result for the client 501. The portal server 503 prepares the received first search result content for delivery to the client 501, and delivers it to the client 501. At some point, a request for content of a second of the search results is transmitted from the client 501 to the portal server 503. When the portal server 503 receives the request from the client 501, the portal determines the source of the request. For example, the portal server 503 accesses the structure to determine if an entry exists for the client 501. If an entry exists, then the portal server 503 determines if the entry indicates the second search result. If not, then a data that indicates selection of the second search result is recorded. Furthermore, a viewing stop time is recorded for the client 501 and for the first search result.

The portal server 503 may also have a process or daemon that periodically cheeks the viewing time tracking structure to determine if a threshold has been reached. Another request from the client 501 may not be received (e.g., the user shuts down the client 501, walks away, a request for content is transmitted that is not visible to the portal server 503, etc.). Upon reaching the threshold, the viewing time for the client 501 and the first search result can be discarded, marked as exceeding the threshold, marked as statistically ambiguous, set to a default value, etc.

As stated above, leveraging a portal can be combined with a script embedded in the content prepared and delivered to the client. For instance, the portal server 503 can embed code that monitors activity at the client 501 (e.g., user interaction with the content). The embedded code reports to the portal server 503 when an event or activity is detected that triggers the portal server 503 to record an end viewing time for a selected search result.

Although viewing time for search result content is useful, viewing time of analogous content can provide richer insight into relevancy. For instance, a client (e.g., a mobile phone, computer, etc.) receives search results in response to submission of a search query on "HDTV theater." A user selects one of the search results that is a reference to a web page for a particular HDTV served from an online consumer electronics store. Regardless of the actual time spent viewing the HDTV content delivered to the client, the user subsequently selects content from the website for a stereo system and for a toaster. Viewing time of the stereo system content can be aggregated or associated with the viewing time of the HDTV content. The aggregation or association of the stereo system content viewing time with the HDTV content viewing time may be desirable because, although different content, the stereo system content is relevant to the HDTV content. In contrast, viewing time of the toaster content is probably ignored since the toaster content likely not relevant to the HDTV content.

Figure 6:
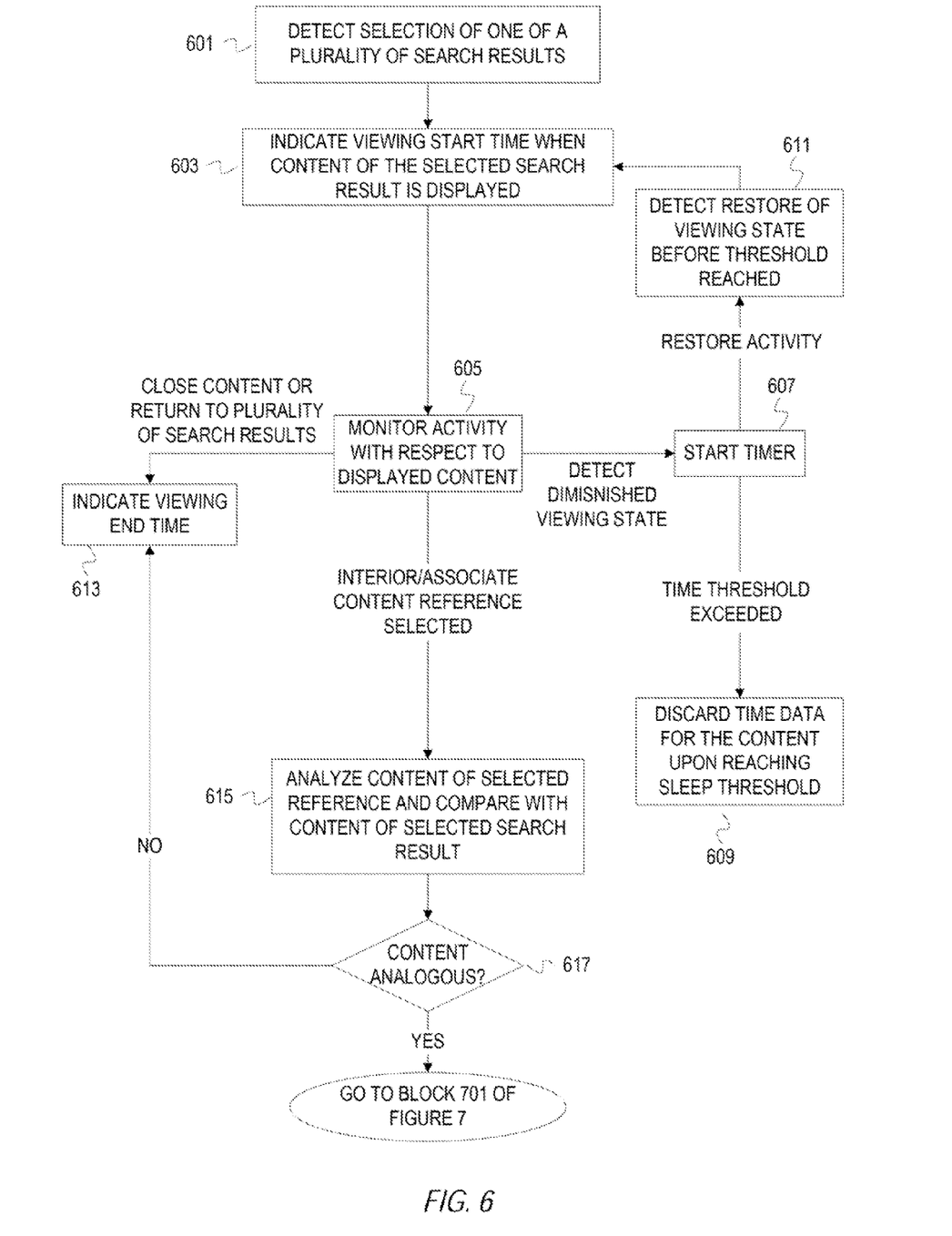
Figure 7:
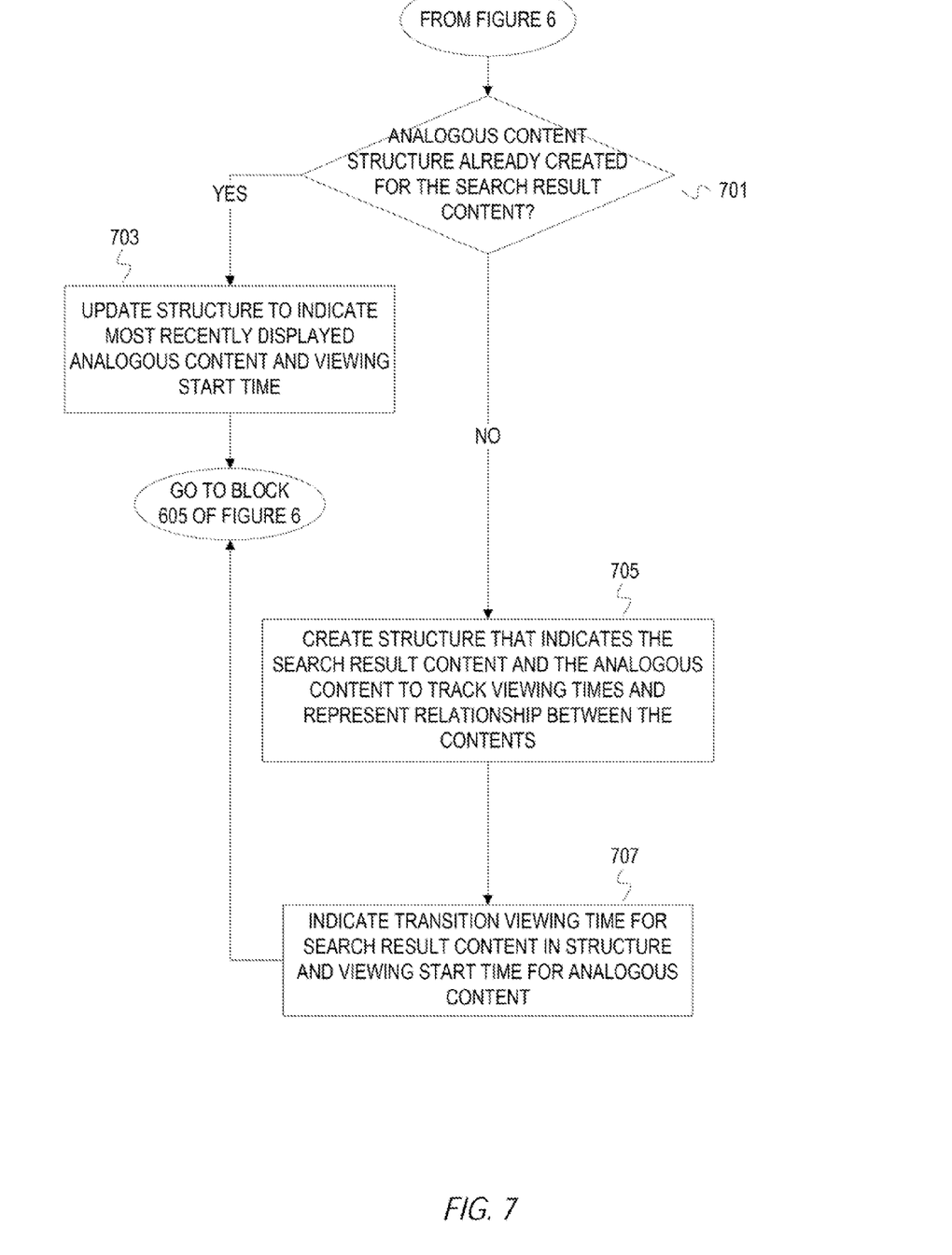
FIG. 7 depicts a flowchart of operations that continue from the flowchart depicted by FIG. 6.

FIGS. 6-7 depict flowcharts of example operations for tracking viewing time of content analogous to search result content. FIG. 6 depicts a flowchart of operations for tracking viewing time of content analogous to search result content. At block 601, selection of one of a plurality of search results is detected. At block 603, a viewing start time is indicated when content of the selected search result is displayed. At block 605, activity with respect to the displayed search result content is monitored. If the content is closed or activity returns to display of the plurality of search results, then control flows to block 613. If a diminished viewing state (e.g., power down, computer sleep mode, monitor sleep mode etc.) is detected for the search result content, then control flows to block 607. If an interior or associated content reference is selected then control flows to block 615. An interior content reference is a content reference (e.g., hyperlink) embedded within the search result content. An associated content reference is a content reference external to the search result content but associated with the search result content. For example, a web page displays the search result content and tabs with hyperlinks to other content. The tabs can be above the search result content, in a different cell or frame than the search result content, etc.

At block 613, viewing end time is indicated.

At block 607, a timer or timing process is started. If a viewing state restore activity occurs, then control flows to block 611. If a time threshold is exceeded, then control flows to block 609.

At block 611, a restore of the viewing state is detected before the threshold is reached. Control flows from block 611 to block 603.

At block 609, the time data for the search result content is discarded upon reaching the threshold.

If an interior or associated content reference was selected at block 605, then content of the selected reference is analyzed and compared with the search result content at block 615. At block 617, it is determined if the contents are analogous based on the analysis and comparison. Examples of parameters for determining contents as analogous include number of common terms, similarities in content titles, similar tags, similar metadata, etc. Embodiments can also evaluate the contents against heuristics, if the contents are analogous, then control flows to block 701 of FIG. 7. If the contents are not analogous, then control flows to block 613.

FIG. 7 depicts a flowchart of operations that continue from the flowchart depicted by FIG. 6. At block 701, it is determined if an analogous content structure has already been created for the analogous content (i.e., the content loaded in response to selection of the interior or associated content reference). If so, then control flows to block 703. If such a structure has not yet been created for the search result content, then control flows to block 705.

At block 703, the structure is updated to indicate the most recently displayed/loaded analogous content and a viewing start time for the analogous content. Control flows from block 703 to block 605 of FIG. 6.

At block 705, a structure is created that indicates the search result content and the analogous content to track viewing times and represent the relationship between the contents. Examples of indications of the contents include addresses, hashes of addresses, a portion of their addresses, etc.

At block 707, a transition viewing time for the search result content is indicated. Also, a viewing start time is indicated for the analogous content. Embodiments can use the viewing start time of the analogous content also as the transition viewing time for the search result content instead of recording separate time stamps. Embodiments can also forego recording transition viewing times or new start time and aggregate all of the time spent on a family of analogous content into a single viewing time value for the search result content.

It should be understood that, the depicted flowchart are examples meant to aid in understanding embodiments and should not be used to limit embodiments or limit scope of the claims. Embodiments may perform additional operations, fewer operations, operations in a different order, operations in parallel, and some operations differently. For instance, additional operations could be depicted in FIG. 3 to accumulate viewing times at a client and report a sum of accumulated viewing times for a particular search result or report the accumulated viewing times as a batch of viewing times. Referring to FIG. 6, the operations for handling diminished viewing state may not be performed, instead, an embodiment can record a viewing stop time for the search result content when the diminished viewing state is detected. As another example, an embodiment can perform operations to tag or separately record the viewing time of the search result content after viewing state is restored. Furthermore, additional operations can be performed to ascertain complexity of content. Content complexity data can be used to set context of the viewing time. A mechanism that ranks relevancy of search result can apply weights based on content complexity to viewing time. Thus, a short viewing time does not suggest low relevancy if the content is simple, and a long viewing time does not suggest high relevancy if content is complex. The complexity weights can be assigned based on number of words, number of images, number of words and images, number of lengthy words, occurrence of formulas, etc.

The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in a machine-readable signal medium, examples of which include an electrical, optical, acoustical or other form of propagated signal (e.g., carrier waves, infrared signals, digital signals, etc.), or wireline, wireless, or other communications medium.

Figure 8:
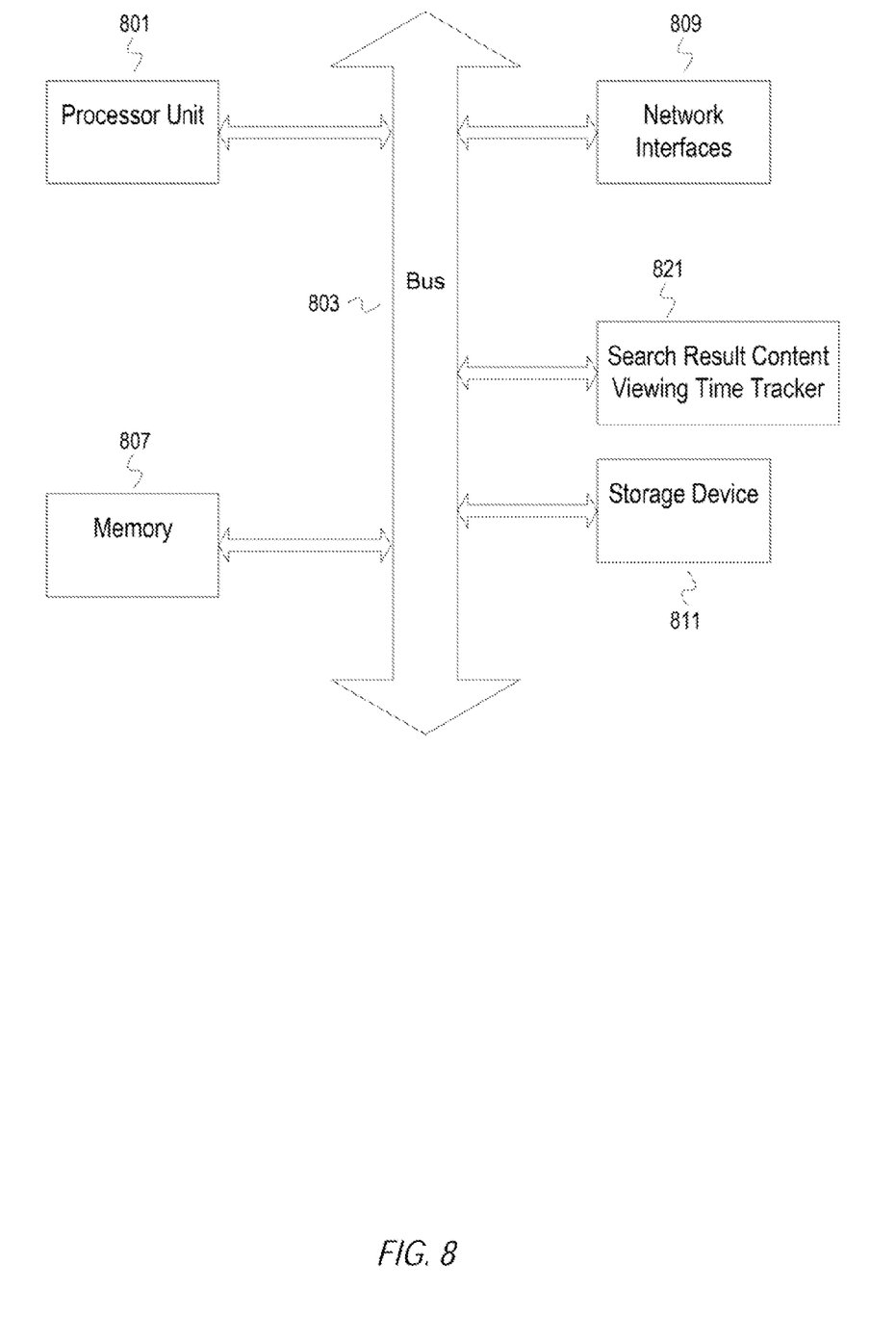
FIG. 8 depicts an example computer system.

FIG. 8 depicts an example computer system. A computer system includes a processor unit 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) and/or any one or more of the above already described possible realizations of machine-readable media. The computer system also includes a bus 803 (e.g., PCI, ISA, PCI-Express, HyperTransport®, InfiniBand®, NuBus, etc.), a network interface 809 (e.g., an ATM interface, an Ethernet interface, a Frame Relay interface, SONET interface, wireless interface, etc.), and a storage device(s) 811 (e.g., optical storage, magnetic storage, etc). The computer system also includes a search, result content viewing time tracker 821 that performs the functionalities for detect selection of a search result and track time content of the selected search result is displayed for viewing. Some or all of the functionality performed by the tracker 821 can be implemented with an application specific integrated circuit, in logic implemented in the processing unit 801, in a co-processor on a peripheral device or card, etc. Moreover, some or all of the functionality performed by the tracker 821 can be embodied in code stored on one or more of the memory 807, the processor unit 801, a co-processor, and the storage device 811. Further, realizations may include fewer or additional components not illustrated in FIG. 8 (e.g., video cards, audio cards, additional network interfaces, peripheral devices, etc.). The processor unit 801, the storage device(s) 811, and the network interface 809 are coupled to the bus 803. Although illustrated as being coupled to the bus 803, the memory 807 may be coupled to the processor unit 801.

While the embodiments are described with reference to various implementations and exploitations, it will be understood that, these embodiments are illustrative and that the scope of the inventive subject matter is not limited to them. For instance, numerous examples refer to entire web pages as examples for presenting content. Content may be embedded, however, in other content (e.g., a balloon of content that is only visible upon mouse over). In addition, a third party or a search engine can apply viewing times for relevancy ranking of search results on individual user accounts or groups of user accounts. For example, the viewing times of an individual may only affect relevancy ranking of search results as presented to the individual. As another example, viewing times of a group of user accounts that indicate a particular geographic region or particular area of interest may only be applied for ranking of search results as presented to any one of the user accounts in the group. In general, techniques for collecting viewing time data of search result content and applying the viewing time data to search results as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall, within the scope of the inventive subject matter.

What is claimed is:

1. A method comprising:
   detecting selection of a first of a plurality of search results, wherein the plurality of search results are received in response to submission of a set of one or more search terms;
   determining an amount of time content of the first search result is displayed for viewing, wherein the content is loaded in response to the selection of the first search result;
   detecting selection of a reference indicated in the content of the first search result or associated with the content of the first search result;
   determining that second content loaded responsive to the selection of the reference is analogous to the content of the first search result;
   determining a second amount of time the second content is displayed for viewing responsive to determining that the second content is analogous to the content of the first search result;
   associating the second amount of time with the amount of time the content of the first search result is displayed; and
   supplying an indication of the amount of time as input for ranking relevancy of the first search result with respect to the set of one or more search terms.

2. The method of claim 1 further comprising ranking relevancy of the first search result with respect to the set of one or more search terms based, at least in part, on the indication and a plurality of other indications of amounts of time the content of the first search result was displayed for active viewing across a multitude of clients.

3. The method of claim 1,
   wherein said determining that the second content is analagous to the content comprises determining at least one of a number of common terms between the content and the second content, similarities in titles of the content and the second content, similarity of tags between the content and the second content, and similarity of metadata between the content and the second content,
   wherein said associating the second amount of time with the amount of time the content of the first search result is displayed comprises aggregating the second amount of time with the amount of time.

4. The method of claim 3 further comprising creating a structure that indicates the content of the first search result and the second content and that indicates the amount of time for the content of the first search result and the second amount of time for the second content.

5. The method of claim 1 further comprising detecting a diminished viewing state of hardware that affects active viewing of the content of the first search result and modifying the amount of time accordingly.

6. The method of claim 1, wherein said determining the amount of time comprises determining time lapsed from initial display of the content of the first search result and detection of an activity associated with discontinued viewing of the content of the first search result.

7. The method of claim 6, wherein the activity comprises at least one of closing a window of the content, closing a tab of the content, selecting a different one of the search results, decreasing operation state of hardware that affects display of the content, obstructing view of the content, and moving a pointing icon over different non-analogous content.

8. The method of claim 1, wherein said determining the amount of time comprises distinguishing between diminishing viewing state of the content and displaying second content for concurrent viewing with the search result content.

9. One or more machine-readable storage media having stored therein a program product, which when executed by a set of one or more processor units causes the set of one or more processor units to perform operations that comprise:

detecting selection of a first of a plurality of search results, wherein the plurality of search results are received in response to submission of a set of one or more search terms;

determining an amount of time content of the first search result is displayed for viewing, wherein the content is loaded in response to the selection of the first search result;

detecting selection of a reference indicated in the content of the first search result or associated with the content of the first search result;

determining that second content loaded responsive to the selection of the reference is analogous to the content of the first search result;

determining a second amount of time the second content is displayed for viewing responsive to determining that the second content is analogous to the content of the first search result;

associating the second amount of time with the amount of time the content of the first search result is displayed; and supplying an indication of the amount of time as input for ranking relevancy of the first search result with respect to the set of one or more search terms.

10. The machine-readable storage media of claim 9, wherein the operations further comprise ranking relevancy of the first search result with respect to the set of one or more search terms based, at least in part, on the indication and a plurality of other indications of amounts of time the content of the first search result was displayed for active viewing across a multitude of clients.

11. The machine-readable storage media of claim 9, wherein said determining that the second content is analagous to the content comprises determining at least one of a number of common terms between the content and the second content, similarities in titles of the content and the second content, similarity of tags between the content and the second content, and similarity of metadata between the content and the second content, wherein said associating the second amount of time with the amount of time the content of the first search result is displayed comprises aggregating the second amount of time with the amount of time.

12. The machine-readable storage media of claim 11, wherein the operations further comprise creating a structure that indicates the content of the first search result and the second content and that indicates the amount of time for the content of the first search result and the second amount of time for the second content.

13. The machine-readable storage media of claim 9, wherein the operations further comprise detecting a diminished viewing state of hardware that affects active viewing of the content of the first search result and modifying the amount of time accordingly.

14. The machine-readable storage media of claim 9, wherein said operation of determining the amount of time comprises determining time lapsed from initial display of the content of the first search result and detection of an activity associated with discontinued viewing of the content of the first search result.

15. The machine-readable storage media of claim 14, wherein the activity comprises at least one of closing a window of the content, closing a tab of the content, selecting a different one of the search results, decreasing operation state of hardware that affects display of the content, obstructing view of the content, and moving a pointing icon over different non-analogous content.

16. The machine-readable storage media of claim 9, wherein said operation of determining the amount of time comprises distinguishing between diminishing viewing state of the content and displaying second content for concurrent viewing with the search result content.

17. An apparatus comprising:
a processor unit;
a bus coupled with the processor unit;
a network interface coupled with the bus; and
a search result content viewing time tracker operable to,
detect selection of a first of a plurality of search results, wherein the plurality of search results are received in response to submission of a set of one or more search terms;

determine an amount of time content of the first search result is displayed for viewing, wherein the content is loaded in response to the selection of the first search result;

detect selection of a reference indicated in the content of the first search result or associated with the content of the first search result;

determine that second content loaded responsive to the selection of the reference is analogous to the content of the first search result;

determine a second amount of time the second content is displayed for viewing responsive to determining that the second content is analogous to the content of the first search result;

associate the second amount of time with the amount of time the content of the first search result is displayed; and supply an indication of the amount of time as input for ranking relevancy of the first search result with respect to the set of one or more search terms.

18. The apparatus of claim 17, wherein the search result content tracker is further operable to rank relevancy of the first search result with respect to the set of one or more search terms based, at least in part, on the indication and a plurality of other indications of amounts of time the content of the first search result was displayed for active viewing across a multitude of clients.

19. The apparatus of claim 17,
wherein said determining that the second content is analagous to the content comprises determining at least one of a number of common terms between the content and the second content, similarities in titles of the content and the second content, similarity of tags between the content and the second content, and similarity of metadata between the content and the second content,
wherein said associating the second amount of time with the amount of time the content of the first search result is displayed comprises aggregating the second amount of time with the amount of time.

20. The apparatus of claim 19, wherein the search result content viewing time tracker is further operable to create in memory a structure that indicates the content of the first search result and the second content and that indicates the amount of time for the content of the first search result and the second amount of time for the second content.

* * * * *